Jan. 10, 1956

F. H. MARTIN 2,730,468

STARCH COOKING APPARATUS

Filed Sept. 24, 1952

INVENTOR.
FURMAN H. MARTIN
BY

*Parrott & Richards*
ATTORNEYS

United States Patent Office 2,730,468
Patented Jan. 10, 1956

2,730,468
STARCH COOKING APPARATUS
Furman H. Martin, Fort Mill, S. C., assignor to The Springs Cotton Mills, a corporation of South Carolina Application September 24, 1952, Serial No. 311,205

6 Claims. (Cl. 127—28)

This invention relates to starch cooking apparatus, and more particularly to an improvement in apparatus of the type disclosed in copending application Serial No. 182,905, filed September 2, 1950, now U. S. Patent No. 2,633,436, issued March 31, 1953, for cooking starch in preparation for sizing textile yarn.

In the above noted copending application the apparatus disclosed incorporates a slurry vat open to atmospheric pressure and a separate closed cooking chamber arranged for introducing live steam therein with conduit means further arranged for recirculating a starch batch from the bottom of the slurry vat through the cooking chamber for direct contact with live steam therein and back to the slurry vat by open discharge at the top thereof. Excellent results have been obtained with this apparatus and the starch cooking method disclosed in the above prior application as the uniformity of the size preparation can thereby be controlled very closely, and the cooking operation can be carried out with great effectiveness and in a considerably shorter period than has been possible according to previous practice.

In certain cases, however, particularly when thin boiling starch is being dealt with, some difficulty is encountered with coagulation on the walls of the slurry vat as the starch batch passes through the gel stage. This coagulation interferes with the proper recirculation of the starch batch for cooking and can be quite troublesome when the coagulation is pronounced.

According to the present invention an improved form of return conduit is provided from the cooking chamber to the slurry vat by which the return discharge of the recirculating starch batch is employed to prevent coagulation on the walls of the slurry vat and thereby eliminate any concern with the above mentioned difficulty.

The improved return conduit arrangement of the present invention is described in detail below in connection with the accompanying drawing, in which.

Figure 1:
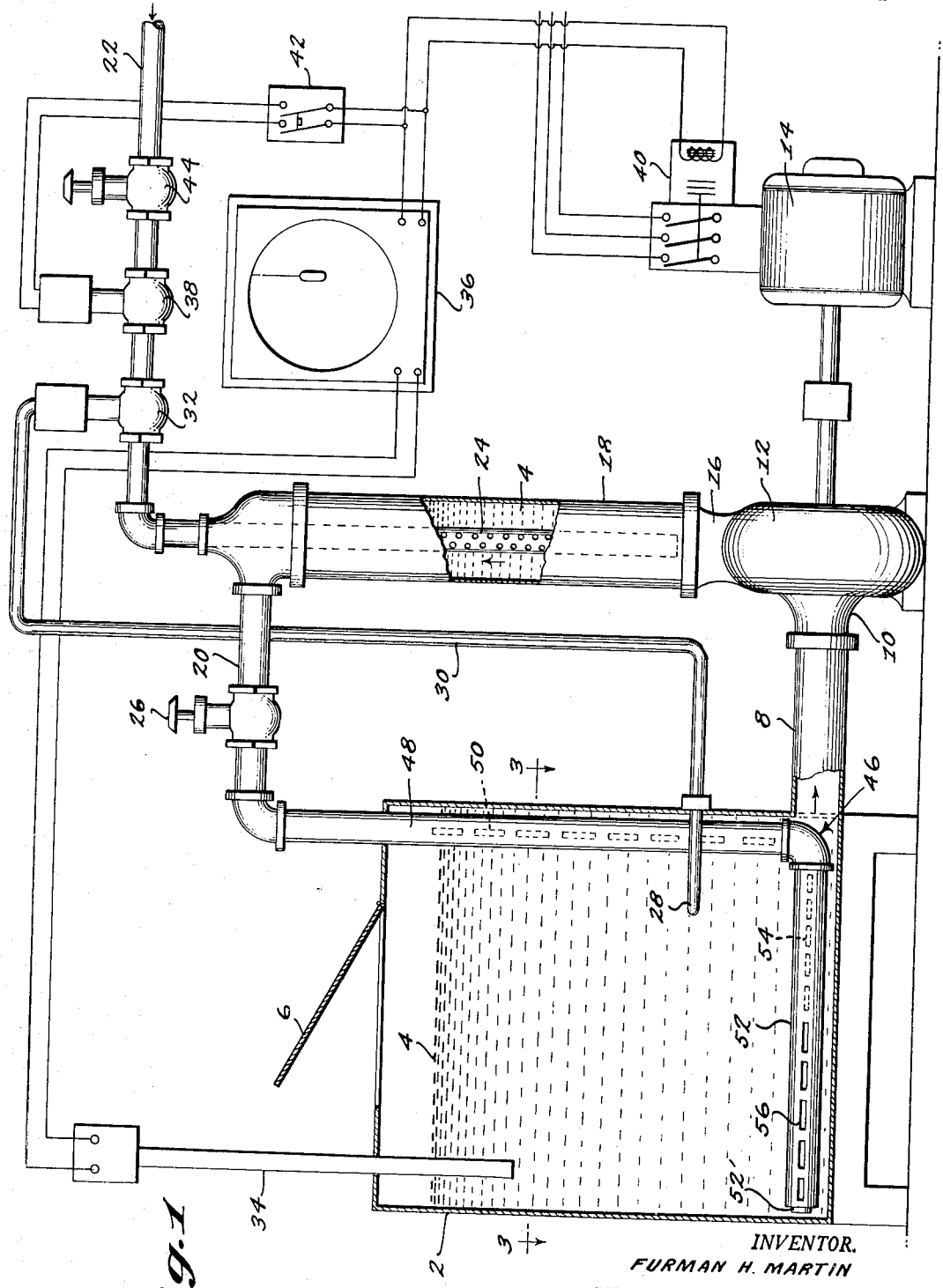
Fig. 1 is a more or less schematic representation of a starch cooking apparatus incorporating an embodiment of a return conduit arranged according to the present invention.

Referring now in detail to the drawings, and more particularly at first to Fig. 1, the starch cooking apparatus shown incorporates basically the arrangement disclosed in the above noted copending application. As shown, this apparatus comprises a slurry vat or kettle 2 of cylindrical shape and of suitable capacity for containing a batch of starch, as at 4, to be cooked. The vat 2 is open to the atmosphere as at the access door 6 and may be otherwise adapted in any convenient manner (not shown) for introduction of the starch batch and removal of the cooked starch solution.

The vat 2 is fitted at its bottom level with a drain line 8 running to the inlet 10 of a pump 12 driven by a motor unit 14. The outlet 16 of this pump 12 is in turn connected to one end of a closed cooking chamber 18, from the other end of which a return line 20 leads to the top of the vat 2. Operation of the pump 12 accordingly results in recirculating the starch batch 4 from the vat 2 through the cooking chamber 18.

To provide for cooking the starch a steam supply line 22 is arranged to run to the cooking chamber 18, and to extend therein in a perforated length as at 24 so that live steam may be introduced as the starch batch is recirculated. Preferably, the cooking chamber 18 is arranged with an elongated form, as shown in the drawing, the cross section of which is enough larger than the outlet 16 of the pump 12 at the least to allow disposition of the extending perforated length 24 of steam line 22 centrally within the cooking chamber 18 and for substantially its entire length. Preferably, the return line 20 is fitted with an adjustable orifice as by a valve 26 so that throttling of the return line 20 may be regulated easily to obtain a suitable pressure in the cooking chamber 18.

The apparatus is also adapted for regulation by suitable automatic controls so that the cooking operation may be carried out with dependable and uniform results. To insure maintaining a proper temperature for the cooking operation, the vat 2 may be fitted with a temperature-sensitive element, such as a thermocouple as at 28, arranged so that it is exposed in the vat 2 at a level that is submerged during the cooking operation, and connected as at 30 for actuating a control valve 32 in the steam line 22 and thereby throttling the steam supply in accordance with the proper cooking temperature for the starch batch being handled.

Also, provision for obtaining uniformity in the viscosity of the cooked size solution is made by disposing a viscosity sensing element as at 34 at a submerged level in the vat 2, and connecting this sensing element 34 through a recording controller 36 which may be set to actuate a control valve valve 38 and a switch unit 40, for closing the steam supply line 22 and stopping the pump motor 14, and thereby terminating the cooking operation when a predetermined viscosity has been attained.

The connection from the recording controller 36 to the control valve 38 should preferably run through a manually operated switch as at 42 so that the pump motor 14 can be operated for precooking agitation with the steam line 22 closed if desired, and a manually operated valve should be disposed as at 44 in the steam line 22 for throttling the steam supply appropriately to the requirements of the apparatus.

According to the present invention, the above described apparatus is further improved by the provision of a specially arranged terminal discharge portion 46 for the return line of conduit 20 running from the cooking chamber 18 to the slurry vat 2. In the above noted copending application the apparatus disclosed has a return line 20 that is fitted with a nozzle adapted for discharging at the top of the slurry vat 2 as an open jet, which provides the substantial advantage of allowing any steam entrained with the recirculating starch batch as it is returned from the cooking chamber 18 to escape harmlessly to the atmosphere at the top of the slurry vat 2 and thereby avoid any difficulty with "boil-ups" in the slurry vat 2. Also, this discharge nozzle arrangement of the prior copending application results in maintaining a good degree of agitation in the slurry vat 2 that is normally adequate to keep the starch batch 4 well conditioned for the necessary recirculating flow, except where the problem of coagulation on the walls of the slurry vat 2 must be dealt with as previously mentioned.

The terminal discharge portion 46 of the present invention retains the characteristic feature of the above prior application in allowing the open escape of any entrained steam, as will be pointed out further presently, and is additionally arranged for continuous agitation of the starch batch 4 in the slurry vat 2 so that difficulty with coagulation on the slurry vat walls is obviated. For this purpose, the terminal portion 46 of the return conduit 20 is arranged to extend vertically adjacent the side wall of the slurry vat 2 for substantially the full height thereof as at 48.

Figure 2:
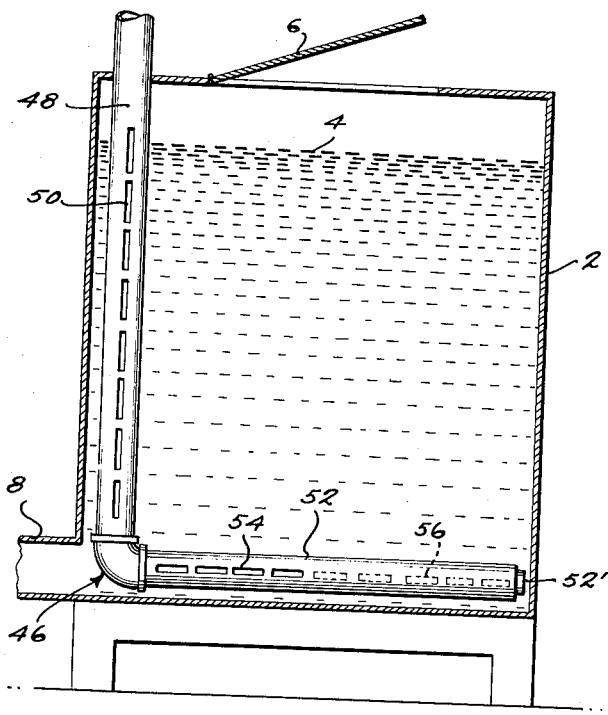
Fig. 2 is a fragmentary detail showing the slurry vat and terminal portion of the return conduit from the side opposite to which it is seen in Fig. 1.
Figure 3:
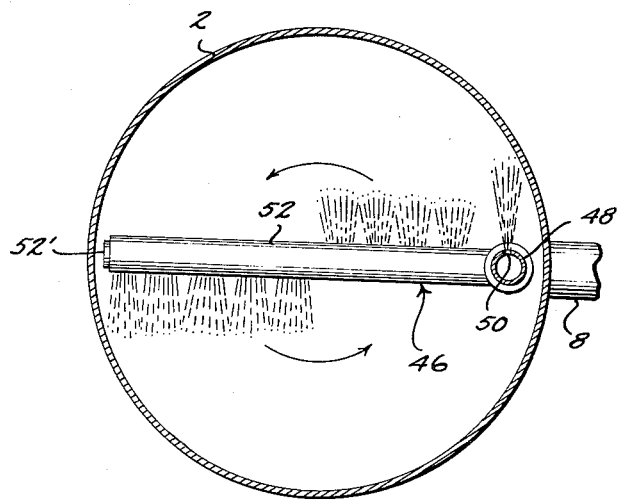
Fig. 3 is a sectional plan detail taken substantially at the line 3—3 in Fig. 1 (the thermocouple being omitted in this view).

At one side of this vertical extent 48 of the terminal portion 46 a plurality of spaced discharge openings 50 (compare Figs. 1 and 2) are aligned in relation to a plane substantially normal to the diameter of the cylindrical slurry vat 2. At least one of these discharge openings 50 is spaced adjacent the top of the slurry vat 2 for discharge openly above the liquid level of starch batch 4 contained therein (as indicated best in Fig. 2), so that the previously mentioned open release of entrained steam is provided for as in the above prior copending application. In addition, the remaining spaced openings 50 function to direct the return discharge of the recirculating starch batch at an incidence that approaches tangency to the side wall of slurry vat 2 (compare Fig. 3) and that induces a swirling agitation of the starch batch 4 adjacent the side wall by which any build-up through coagulation on the side wall is effectively prevented from starting.

Preferably, the terminal discharge portion 46 also includes a horizontal length as at 52 extending diametrically adjacent the bottom of the slurry vat 2, the terminal portion 46 in any case having the end thereof closed, as by an end plug shown at 52' in the horizontal length 52, in order to direct the return discharge through the discharge openings such as 50. In order to supplement and aid the swirling agitation provided by the spaced discharge openings 50 in the vertical extent 48 of the terminal portion 46, the horizontal extent 52 may also be arranged with similar openings aligned as at 54 in the corresponding side of this horizontal length 52 in the part thereof, between the center of slurry vat 2 and the juncture with the vertical length 48, and oppositely disposed as at 56 in the horizontal length 52 beyond the center of the slurry vat 2. In this way, the return discharge can be made not only to aid the swirling agitation of the starch batch 4 by which the slurry vat side wall is maintained free of coagulation deposits, but also to create a supplemental turbulence from the bottom of slurry vat 2 that prevents the agitation from the vertically spaced discharge openings 50 from becoming purely channeled in its swirling effect on the starch batch 4.

The present invention has been described above for purposes of illustration only and is not intended to be limited by this description or otherwise except as defined in the appended claims.

I claim:

1. In apparatus for cooking starch incorporating a cylindrical slurry vat for containing a batch of starch to be cooked and a separate cooking chamber with conduit means arranged for recirculating a starch batch from said slurry vat through said cooking chamber and back to said slurry vat, the improvement which comprises a return conduit from said cooking chamber to said slurry vat having a closed-end terminal portion extending in part vertically adjacent the side wall of said slurry vat and in part horizontally adjacent the bottom thereof, with at least one discharge opening aligned at one side of the vertical part of said terminal portion so as to provide a discharge stream of liquid substantially tangential to the inner surface of said slurry vat, and with at least one discharge opening in the corresponding side of the horizontal part of said terminal portion adjacent said vertical part and at least one oppositely disposed discharge opening in said horizontal part remote from said vertical part.

2. In apparatus for cooking starch incorporating a cylindrical slurry vat for containing a batch of starch to be cooked and a separate cooking chamber with conduit means arranged for recirculating a starch batch from said slurry vat through said cooking chamber and back to said slurry vat, the improvement which comprises a return conduit from said cooking chamber to said slurry vat having a closed-end terminal portion extending in part vertically adjacent the side wall of said slurry vat and in part horizontally and diametrically adjacent thereof, with a first plurality of spaced discharge openings aligned at one side of the vertical part of said terminal portion so as to provide a discharge stream of liquid substantially tangential to the inner surface of said slurry vat, and with a second plurality of spaced discharge openings aligned in the corresponding side of the horizontal part of said terminal portion at the radial half thereof adjacent said vertical part and a third plurality of spaced discharge openings oppositely disposed from said second plurality in the radial half of said horizontal part remote from said vertical part.

3. In apparatus for cooking starch incorporating a cylindrical slurry vat open to atmospheric pressure and a separate closed cooking chamber arranged for introducing live steam therein with conduit means arranged for recirculating a starch batch from the bottom of said slurry vat through said cooking chamber for direct contact with live steam therein and back to said slurry vat, the improvement which comprises a return conduit from said cooking chamber to said slurry vat having a closed-end terminal portion extending first vertically adjacent the side wall of said slurry vat for substantially the full height thereof and then horizontally and diametrically adjacent the bottom thereof, with a first plurality of spaced discharge openings aligned at one side of the vertical extent of said terminal portion so as to provide a discharge stream of liquid substantially tangential to the inner surface of said slurry vat, at least one of said first plurality of discharge openings being spaced adjacent the top of said slurry vat for discharge openly above the liquid level of a starch batch contained therein, and with a second plurality of spaced discharge openings aligned in the corresponding side of the horizontal extent of said terminal portion in the part thereof between the center of said slurry vat and the juncture with said vertical extent and a third plurality of spaced discharge openings oppositely disposed from said second plurality in said horizontal extent beyond the center of said slurry vat.

4. Apparatus for cooking starch comprising a slurry vat for containing a batch of starch to be cooked, a separate cooking chamber, a conduit connecting said cooking chamber and vat for supplying the starch slurry to the cooking chamber, and a return conduit for recirculating the cooked starch slurry, said return conduit extending vertically along one inner wall of the vat and extending further horizontally along the bottom of said vat, said vertically extending conduit having perforations aligned on one side of said conduit, and said horizontally extending conduit having perforations aligned in a plane parallel to the bottom of said slurry vat.

5. A starch cooking apparatus as defined in claim 4 and in which a portion of the aligned perforations in the horizontally extending conduit is located on one side of said conduit and another portion of said perforations is located on an opposite side of said conduit.

6. In apparatus for cooking starch comprising a slurry vat for containing a batch of starch to be cooked, a separate cooking chamber, a return conduit connecting said cooking chamber and said vat for recirculating the cooked starch slurry, said return conduit having a terminal portion comprising a vertically extending conduit along one inner wall of said vat and a horizontally extending conduit along the bottom of said vat, said vertically extending conduit having perforations located in a plane perpendicular to bottom of said vat, and said horizontally extending conduit having perforations located in a plane perpendicular to the plane of said perforations in the vertically extending conduit.

References Cited in the file of this patent

UNITED STATES PATENTS

| | | |
|---|---|---|
| 633,066 | Brewer | Sept. 12, 1899 |
| 2,516,884 | Kyame | Aug. 1, 1950 |
| 2,633,436 | Martin | Mar. 31, 1953 |